United States Patent
Zeier (10) Patent No.: US 8,330,428 B2
(45) Date of Patent: Dec. 11, 2012

(54) LEAD ACID BATTERY DE-SULFATION

(76) Inventor: Bruce Eric Zeier, Romoland, CA (US)

( * ) Notice: Subject to any disclaimer, the term of this patent is extended or adjusted under 35 U.S.C. 154(b) by 435 days.

(21) Appl. No.: 12/590,466

(22) Filed: Nov. 9, 2009

(65) Prior Publication Data

US 2010/0117604 A1    May 13, 2010

Related U.S. Application Data

(60) Provisional application No. 61/114,051, filed on Nov. 12, 2008.

(51) Int. Cl.
*H02J 7/00* (2006.01)
(52) U.S. Cl. .................... 320/166; 320/139
(58) Field of Classification Search .......... 320/166
See application file for complete search history.

(56) References Cited

U.S. PATENT DOCUMENTS

| 5,648,714 | A | 7/1997 | Eryou et al. |
| 5,677,612 | A | 10/1997 | Campagnuolo et al. |
| 5,891,590 | A | 4/1999 | King |
| 6,184,650 | B1 | 2/2001 | Gelbman |
| 6,414,465 | B1 | 7/2002 | Banks et al. |
| 6,556,019 | B2 | 4/2003 | Bertness |
| 6,586,850 | B1 | 7/2003 | Powers |
| 6,586,913 | B2 | 7/2003 | Rolfes |
| 6,822,425 | B2 * | 11/2004 | Krieger et al. ............ 320/139 |
| 7,145,266 | B2 | 12/2006 | Lynch et al. |
| 2008/0143299 | A1 | 6/2008 | Altman |
| 2008/0169819 | A1 * | 7/2008 | Ishii ........................ 324/430 |
| 2008/0185996 | A1 | 8/2008 | Krieger et al. |
| 2009/0289602 | A1 * | 11/2009 | Ng ............................ 320/139 |

FOREIGN PATENT DOCUMENTS

WO    PCT/US09/0603    11/2009

* cited by examiner

*Primary Examiner* — Arun Williams
(74) *Attorney, Agent, or Firm* — Baker & Hostetler LLP (57) ABSTRACT

A de-sulfating device including a plurality of capacitive discharge channels selectively activatable by a control board to provide a pulse wave modulated de-sulfating current to a lead-acid battery. Some exemplary embodiments may provide a de-sulfating current comprising a repeating pattern including an about 0.75 ms ON pulse followed by an about 4.5 ms OFF period, which may be applied to the battery at an operator-adjustable peak amperage of about 0-350 amps. The extent of sulfation of the battery may be ascertained by measuring the impedance of the battery.

6 Claims, 4 Drawing Sheets

LEAD ACID BATTERY DE-SULFATION

CROSS REFERENCE TO RELATED APPLICATIONS

This application claims the benefit of U.S. Provisional Application No. 61/114,051, filed Nov. 12, 2008, which is incorporated by reference.

BACKGROUND

The present disclosure is directed to reconditioning lead acid batteries and, more particularly, to de-sulfating lead acid batteries and to de-sulfating devices.

The present disclosure contemplates that some lead acid batteries may be constructed using individual cells connected by an external bus bar to form the nominal voltage desired from the battery. Individual cells may provide about two volts each; thus, a 12-volt motive battery may include 6 cells in series, a 24 volt battery may include twelve cells, and so on.

The following U.S. patents may be related to battery reconditioning and are incorporated by reference into this Background section: U.S. Pat. Nos. 5,677,612; 5,648,714; 5,891,590; and 6,184,650.

SUMMARY

Exemplary embodiments may include a de-sulfating device including a plurality of capacitive discharge channels selectively activatable by a control board to provide a pulse wave modulated de-sulfating current to a lead-acid battery. Some exemplary embodiments may provide a de-sulfating current comprising a repeating pattern including an about 0.75 ms ON pulse followed by an about 4.5 ms OFF period, which may be applied to the battery at an operator-adjustable peak amperage of about 0-350 amps. The extent of sulfation of the battery may be ascertained by measuring the impedance of the battery.

In an aspect, a method of de-sulfating a battery may include connecting a de-sulfating device to a battery; applying electrical pulses to the battery using the de-sulfating device, where the pulses comprise a repeating pattern including an about 0.1-1.5 ms ON pulse followed by an about 1-6 ms OFF period.

In a detailed embodiment, the ON pulse may be about 0.4-0.85 ms and the OFF period may be about 2.5-5.5 ms. In a detailed embodiment, the ON pulse may be about 0.75 ms and the OFF period may be about 4.5 ms. In a detailed embodiment, the operation of connecting the de-sulfating device to the battery may include electrically connecting conductors between the de-sulfating device and an individual cell of the battery or terminals of the battery, where the terminals are electrically connected across a plurality of cells of the battery.

In a detailed embodiment, the operation of applying electrical pulses to the battery using the de-sulfating device may include selectively repeatedly activating a plurality of channel power pack modules electrically connected between an alternating current source and the battery, and, when activated, an individual channel power pack module may provide one ON pulse to the battery. In a detailed embodiment, the plurality of channel power pack modules may include a first channel power pack module and a second channel power pack module, and the operation of applying electrical pulses to the battery using the de-sulfating device may include alternately activating the first channel power pack module and the second channel power pack module.

In a detailed embodiment, the individual channel power pack module may include a rectifier electrically connected to the alternating current source, a capacitor electrically connected to the output of the rectifier, a switching device electrically coupled to the capacitor, and a diode electrically coupled to the switching device, the diode being electrically connected to the battery, and the operation of applying electrical pulses to the battery using the de-sulfating device may include rectifying, using the rectifier, alternating current supplied by the alternating current source to produce direct current; charging the capacitor using the direct current; and discharging the capacitor to the battery by selectively allowing conduction through the switching device. In a detailed embodiment, the operation of discharging the capacitor to the battery by selectively allowing conduction through the switching device may include determining, by a master control board, that the switching device should allow conduction, including ascertaining that a plurality of safety conditions are satisfied and may be based at least partially upon a pulse signal received from a frequency generator; and signaling, by the master control board, the switching device to allow conduction.

In a detailed embodiment, the alternating current source may include a variable voltage alternating current source, and the method may include adjusting an output voltage of the variable voltage alternating current source to obtain a desired peak amperage of the pulses.

In a detailed embodiment, a method may include determining that de-sulfation of the battery is substantially complete by measuring an impedance of the battery. In a detailed embodiment, the impedance of the battery may be determined at least in part from a difference between a root-mean-square amperage of the pulses and a peak amperage of the pulses.

In a detailed embodiment, the operation of applying electrical pulses to the battery using the de-sulfating device may include applying an ON pulse having a peak amperage of about 20-30 amps. In a detailed embodiment, the operation of applying electrical pulses to the battery using the de-sulfating device may include applying an ON pulse having a peak amperage of about 40-60 amps. In a detailed embodiment, the operation of applying electrical pulses to the battery using the de-sulfating device may include applying an ON pulse having a peak amperage of about 40-130 amps. In a detailed embodiment, the operation of applying electrical pulses to the battery using the de-sulfating device may include applying an ON pulse having a peak amperage of about 130-350 amps.

In an aspect, a battery de-sulfation device may include an alternating current source; output conductors configured for electrical connection to a battery; a plurality of channel power pack modules electrically interposing the alternating current source and the output conductors, each channel power pack module including a rectifier electrically connected to the alternating current source, a capacitor electrically connected to an output of the rectifier, a switching device electrically connected to the capacitor, and a diode electrically connected to the output of the switching module; and a master control board operative to control a conduction state of each of the switching devices. The master control board may be configured to control the conduction states of the switching devices to provide a pulsed direct current output to the battery.

In a detailed embodiment, the alternating current source may be a variable voltage alternating current source, and a voltage output from the variable voltage alternating current source may be adjustable by an operator.

In a detailed embodiment, the master control board may be configured to control the conduction states of the switching devices to provide a pulsed direct current output to the battery including a repeating pattern including approximately 0.75 ms ON pulses interposed by approximately 4.5 ms OFF periods.

In a detailed embodiment, a de-sulfating device may include a peak amperage indicator providing an indication of a peak amperage provided to the battery; an average amperage indicator providing an indication of a root-mean-square amperage provided to the battery; and an impedance indicator providing an indication of an impedance of the battery, where the impedance may be determined at least in part by ascertaining a difference between the peak amperage provided to the battery and the root-mean-square amperage provided to the battery.

In a detailed embodiment, the master control board may be configured to control the conduction states of the switching devices associated with the first channel power pack module and the second channel power pack modules alternately such that each of the first channel power pack module and the second channel power pack module outputs a repeating pattern including an about 0.75 ms ON pulse followed by an about 9.75 ms OFF period and, together, the first channel power pack module and the second channel power pack module provide to the battery a repeating pattern including an about 0.75 ms ON pulse followed by an about 4.5 ms OFF period.

BRIEF DESCRIPTION OF THE DRAWINGS

The detailed description refers to the following figures in which.

DETAILED DESCRIPTION

The present disclosure includes, inter alia, methods and devices for reconditioning lead acid batteries. Some example embodiments may remove sulfation from lead acid batteries, which may improve battery performance.

The present disclosure contemplates that sulfation is a process in which a lead-acid battery loses the ability to hold a charge due to the accumulation of lead sulfates. Lead-acid batteries generate electricity through a double sulfate chemical process in which lead and lead dioxide, the plate's active materials, react with sulfuric acid in the electrolyte. Lead acid batteries form sulfate accumulations upon the internal leads plates, whether the battery is being charged and discharged, or simply inactive in storage. These sulfates may slow and may ultimately prevent the transfer of electrical ions when a battery is used in normal operation. This slowing and ultimate prevention of electrical transfer in and out of the battery may cause the ultimate rejection of the battery for continued service.

The present disclosure contemplates that the degree of battery sulfation may be described with reference to levels, such as Level 1, Level 2, and Level 3. Level 1 sulfation may include the normal process of transferring electrical energy from the battery electrolyte (from the sulfur ion of H2SO4) to the battery plates and terminals, then out to the use of the battery's stored energy. Charging of the battery using a normal battery charger may restore most Level 1 sulfates back into solution. However, this restoration of the sulfur ion back into solution may be an imperfect process. Thus, a certain percentage of sulfur ions may remain on the lead plates, which is categorized as Level 2 sulfation.

The present disclosure contemplates that Level 2 sulfation may include the accumulation of sulfur ions that were not restored back into the electrolyte solution during a battery charging process. Level 2 sulfation may begin to impair the normal process of charging and discharging of the battery. Left in this Level 2 state, sulfur ions may eventually form a crystalline shape and chemically bond with the porous lead plate surface. This newly developed crystalline form, PbSO4, may be considered Level 3 sulfation.

The present disclosure contemplates that Level 3 sulfation may be the most aggressive form of battery plate sulfation. Further, the present disclosure contemplates that previous pulse width modulation methodologies of de-sulfating have been shown to be ineffectual when attempting to de-sulfate large lead-acid batteries, such as may be used in motive energy applications.

The present disclosure contemplates that some professional battery shops may attempt to de-sulfate a motive battery by putting the battery through several charge/discharge cycles, often at a higher than recommended voltage. Such a process may take days or weeks, and may use a substantial amount of charging electricity, with often-uncertain results. The battery may then be acid equalized by adding higher concentrations of sulfuric acid to increase individual cells' specific gravities. In many cases, the battery may be taken to the battery shop's facility to conduct this process, thus resulting in a loss of use of the battery and added expense.

The present disclosure contemplates that a battery, such as a lead-acid storage battery, may comprise a plurality of cells. Further, the present disclosure contemplates that individual cells may be readily accessible in some batteries. Accordingly, unless otherwise specified, any references herein to connecting a device to a battery, applying a current to a battery, performing a process on a battery, and the like means conducting such actions on any one or more cells of a battery.

Figure 1:
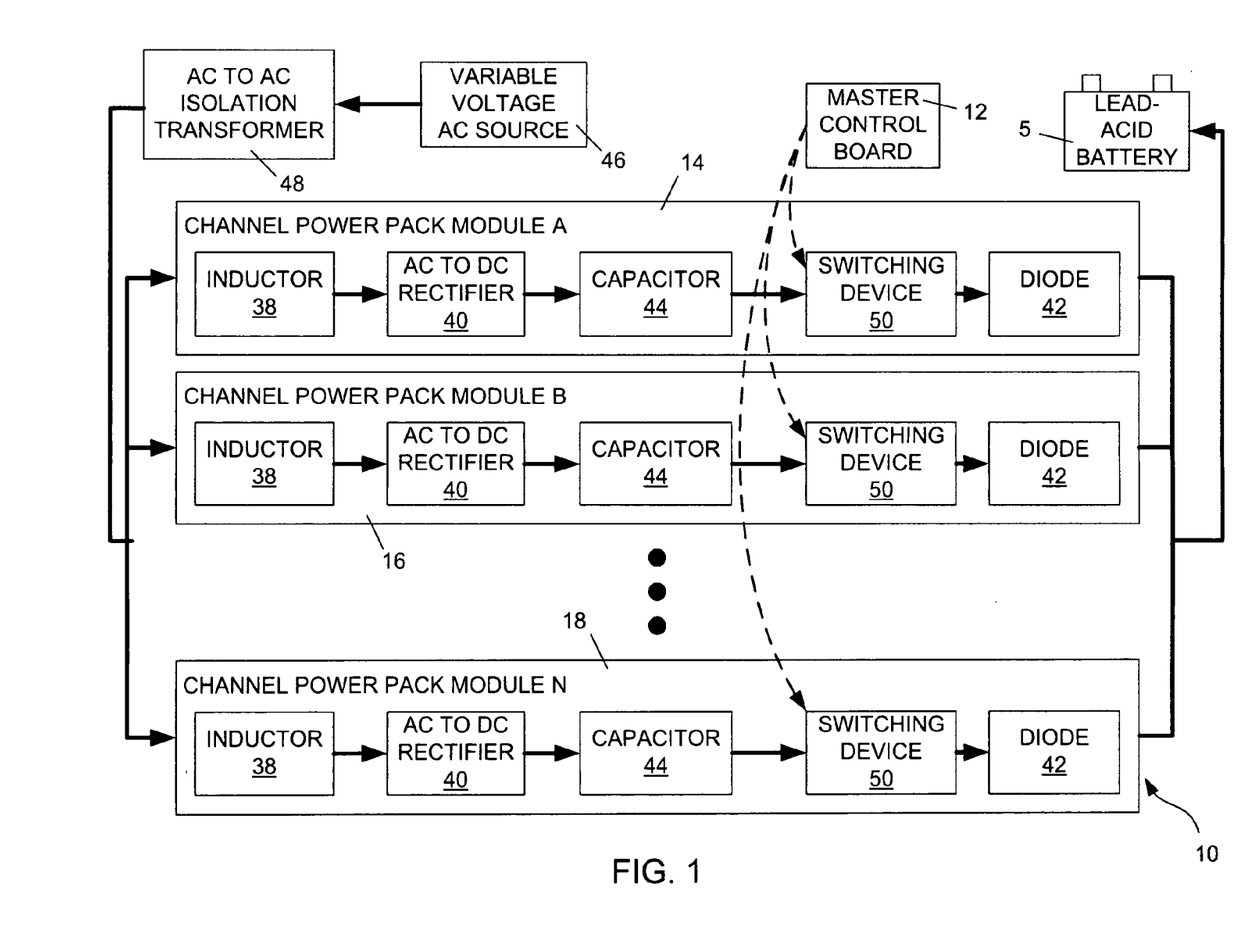
FIG. 1 is block diagram of an exemplary battery de-sulfating device.

Referring to FIG. 1, an exemplary battery de-sulfating device 10 may be configured to apply pulse width modulated (PWM) direct current (DC) to a battery 5. An example de-sulfating device 10 may include a master control board 12 and one or more channel power pack modules 14, 16, 18, which may be operatively connected to the battery 5. Channel power pack module N 18 represents any positive integer N number of channel power pack modules.

An exemplary individual channel power pack module 14, 16, 18 may comprise a capacitive discharge switching module and/or may receive power supplied from a variable voltage alternating current (AC) source 46, which may include a variac, switching-mode power supply with voltage adjustment capability, and/or another device capable of providing an operator-adjustable AC voltage. The voltage provided by variable voltage AC source 46 may be selectively provided to and isolated from battery 5 by channel power pack modules 14, 16, 18 pursuant to PWM signals from master control board 12. The switched PWM current and voltage may be applied to battery 5 to de-sulfate battery 5.

In some exemplary embodiments, variable voltage AC source 46 and one or more channel power pack modules 14, 16, 18 may be interposed by an isolation transformer 48, which may include primary and secondary windings, for example. Isolation transformer 48 may act as a voltage modifier and/or as a safety device by providing electrical isolation from the line source commercial power grid. After the line voltage is modified variable voltage AC source 46 and electrically isolated and/or modified by isolation transformer 48, it may be provided to individual channel power pack modules 14, 16, 18.

In some exemplary embodiments, variable voltage AC source 46 may include a variac. In some exemplary embodiments, variable voltage AC source 46 may include a transformer having a plurality of input or output taps providing different voltages. In such an embodiment, appropriate input or output taps providing a desired voltage may be connected to one or more channel power pack modules 14, 16, 18, such as by using one or more relays. If a different voltage is desired, channel power pack modules 14, 16, 18 may be connected to different taps, such as by energizing or de-energizing one or more relays.

In some exemplary embodiments, an individual channel power pack module 14, 16, 18 may include an inductor 38, a rectifier 40, a capacitor 44, a switching device 50, and/or a diode 42. Inductor may be installed in series before rectifier 40 to increase the stability of the output. Rectifier 40 may convert the operator-controlled AC voltage provided by variable voltage AC source 46 to a DC voltage. Capacitor 44 may accumulate electrical charge associated with the DC voltage. Switching device 50 may be selectively actuated as directed by the master control board 12 to deliver electrical energy accumulated in capacitor 44 to the battery, and may comprise a transistor (such as a, insulated-gate bipolar transistor, gate bi-directional transistor, and/or equivalent) or other electronic switching device known in the art (such as a solid state switching device), for example. Diode 42 may be configured as a reverse current protection diode to prevent current from the battery from flowing in the reverse direction through the channel power pack module 14, 16, 18, and may comprise a Schottky barrier diode, for example. Some example embodiments may include one or more heat sinks.

In some exemplary embodiments, the channel power pack modules 14, 16, 18 may receive signal inputs from MCB 12 in the form of pulse width modulated electrical signals. These signals may cause transistors 50 to open and/or close (e.g., change conduction state between non-conductive and conductive) at a prescribed frequency, which may switch on and off the DC current to battery 5.

Figure 2:
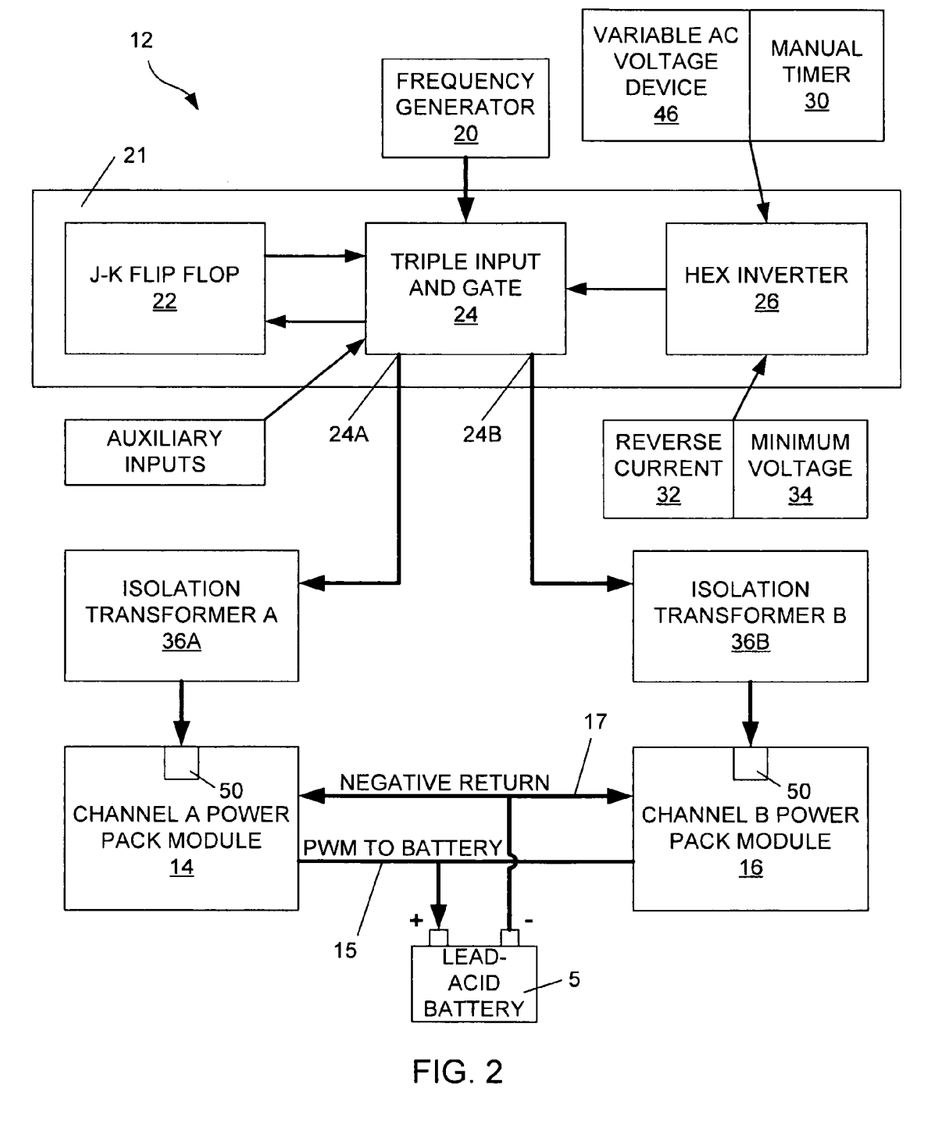
FIG. 2 is a logic block diagram of an exemplary master control board.

FIG. 2 is a logic block diagram of an exemplary master control board (MCB) 12. MCB 12 may include logic and/or control circuitry which may be operative to separate and divide the required PWM output into equal and/or alternating signals, which may be sent to a plurality of channel power pack modules 14, 16, 18. MCB 12 may provide inputs and/or outputs for various instruments, indicators (such as LEDs), sensors, and/or switches.

An exemplary MCB 12 may include a frequency generator 20, which may output a pulse signal at an operator-adjustable frequency, such as, without limitation, within a frequency range of about 50-400 Hz. This signal may be used by MCB 12 as a pulse width modulation frequency. In some example embodiments, frequency generator 20 may produce the pulse with modulated frequency signal using a simple timer circuit based upon a 555 timer, a commercially available frequency generator, and/or a functional equivalent. As an alternative or in combination, a software-driven microprocessor and/or computer may be utilized as frequency generator 20. The pulse width modulation frequency signal may be generated as specified by the operator (e.g., it may be operator adjustable).

An exemplary MCB 12 may include a logic processing module 21 and/or one or more isolation transformers 36A, 36B. An example logic processing module 21 may receive the pulse width modulation frequency signal from frequency generator 20 and may include a logic J-K flip-flop 22 (and/or several flip-flops in parallel), a logic triple input AND gate 24, and/or a logic hex inverter 26. Some example MCBs 12 may include an operational amplifier configured to provide indication of peak-to-peak amplitude of the output pulses to the battery.

In an exemplary embodiment, logic triple input AND gate 24 may include three logic gates, which may be identified as a channel A output gate 24A, a channel B output gate 24B, and/or a safety gate. Each of these logic gates may include three input gates, which must all be in the "Hi" state for the system to operate normally. If any of the gates are in a "Low" state, then the system may not operate.

In some exemplary embodiments, J-K flip-flop 22 may provide "Set-Reset" functions, PWM input timing functions, and/or Q and Q prime output functions. J-K flip-flop 22 may receive the PWM frequency signal from frequency generator 20 and may alternate the PWM frequency signal equally between Q and Q prime outputs. The Q and Q prime alternating output may be sent to the respective channel A output gate 24A and channel B output gate 24B when the "Set-Reset" condition is in the "Set" mode. In the "Reset" mode, no PWM frequency signal may be sent to the channel output gates 24A, 24B. In an "N" channel design, additional logic flip-flops may control the PWM distribution upstream of the primary J-K operational flip-flops.

In some exemplary embodiments, safety gate may receive three logic inputs, which may all be required to be in the "Hi" state for normal system operation. The required "Hi" state inputs to safety gate may include (1) a greater than 5 VDC reference voltage, (2) an inverted signal from hex inverter 26 (which may be supplied from variable voltage AC source 46), and/or (3) a greater than 5 VDC input from manual timer 30, one or more temperature safety switches, and/or other switches or sensors within the system. In the event that any safety system parameter is exceeded, the corresponding safety gate channel will go "Low," thereby disabling the system. This system may be the same regardless of the number of N channels the system is designed to operate, since one safety gate may control N channels.

In some exemplary embodiments, channel A output gate 24A and channel B output gate 24B may operate in a substantially identical, yet alternating manner. Individual output gates 24A, 24B may require three "Hi" state inputs for normal system operation, such as (1) a PWM frequency signal (e.g., a clock signal) from frequency generator 20, (2) a "Set" (e.g., latching) condition "Hi" signal from the J-K flip-flop 22, and/or (3) a Q signal from J-K flip-flop 22 for channel A operation and a Q prime signal from J-K flip-flop 22 for channel B operation.

In some exemplary embodiments, in normal two-channel system operation, Q "Hi" state and Q prime "Hi" states may equally alternate to divide the PWM signal requirements between channel power pack module A 14 and channel power pack module B 16. Therefore, in normal two channel system operation, the PWM output may be equally divided between channel A and channel B, allowing respective capacitors 44 to increase their charges between discharge cycles, while maintaining an output frequency otherwise not attainable with a single channel system, assuming the same capacitor charge cycle requirements. Some exemplary embodiments including N channels may include additional channel output gates operatively connected to respective additional channel power pack modules 18. Such a configuration may distribute the PWM frequency output requirements by dividing the PWM timing requirements into N divisions.

In an exemplary embodiment, hex inverter 26 may be used as a logic inversion device; thus, when its input voltage is "Hi," the output is "Low." In some exemplary embodiments, hex inverter 26 may provide a safety function and/or a "Set-Reset" function for normal operation of the logic gates. As a safety function, the sense signal derived from variable voltage AC source 46 (or other input sources), may be rectified (or processed) to DC voltage by MCB 12, converted by hex inverter 26 to either logic "Hi" or logic "Low," then passed to the "Set" gate of J-K flip-flop 22. When this rectified signal input (or alternative processed input) is greater than 5 VDC, hex inverter 26 may provide a "Low" signal to J-K flip-flop 22, which in turn may cause the "Set" gates of channel A output gate 24A and channel B output gate 24B (and/or channel N) to read "Low," thereby preventing the operation of channel A and channel B. When the rectified signal from the variable transformer (or alternative processed input) is less than 5 VDC and inverted by hex inverter 26, a "Hi" signal may be provided to J-K flip-flop 22, which in turn may causes the "Set" gates of channel A output gate 24A and channel B output gate 24B (and/or channel N) to read "Hi," allowing the operation of the channels. Thus, this function may only allow the operation of all channels when the variable input AC transformer manual knob is in the "Off" position (or other input sources are in the safe mode) during the "setting or resetting" process of the logic gates, as when the system is starting. Once the system logic is "Set-Hi" and the channels are functioning, then they will continue to operate until the "Reset" function of J-K flip-flop 22 becomes "Hi," shutting down the system. Hex inverter 26 can also be used to invert safety signals from other additional safety monitoring devices, such as, for example and without limitation, temperature switches, voltage detectors, and/or other devices which may be configured to detect safety-related and/or operational conditions.

In some exemplary embodiments, hex inverter 26 may provide a "Set/Reset" latching function by processing a voltage input from manual timer 30, one or more temperature safety switches, a "missing peak" detector, reverse current sensors 32, minimum voltage sensors 34, and/or any additional or optional sensors, or any combination of the above. More specifically, a voltage signal of greater than 5 VDC may be passed through manual timer 30, one or more temperature safety switches, and/or other sensors and may be received by hex inverter 26. When the manual timer 30 and/or other series connected switches/sensors are in the open or off state, a low voltage "Low" signal state is presented to hex inverter 26, which causes a "Hi" signal to be sent to the "Reset" input of to J-K flip-flop 22. This "Hi" signal at the "Reset" of J-K flip-flop 22, causes the "Set" pathway of the safety gate to remain open (or remain inoperative) preventing any channel logic gates from satisfying all three "Hi" states required for operation. When a voltage signal greater than 5 VDC is provided through the safety switches and/or manual timer 30, then hex inverter 26 sends a "Low" signal to the "Reset" of J-K flip-flop 22, which in turn allows the "Set" function to close (or operate), thus allowing a "Hi" signal to pass through to channel A output gate 24A, channel B output gate 24B, and/or the safety gate.

Figure 3:
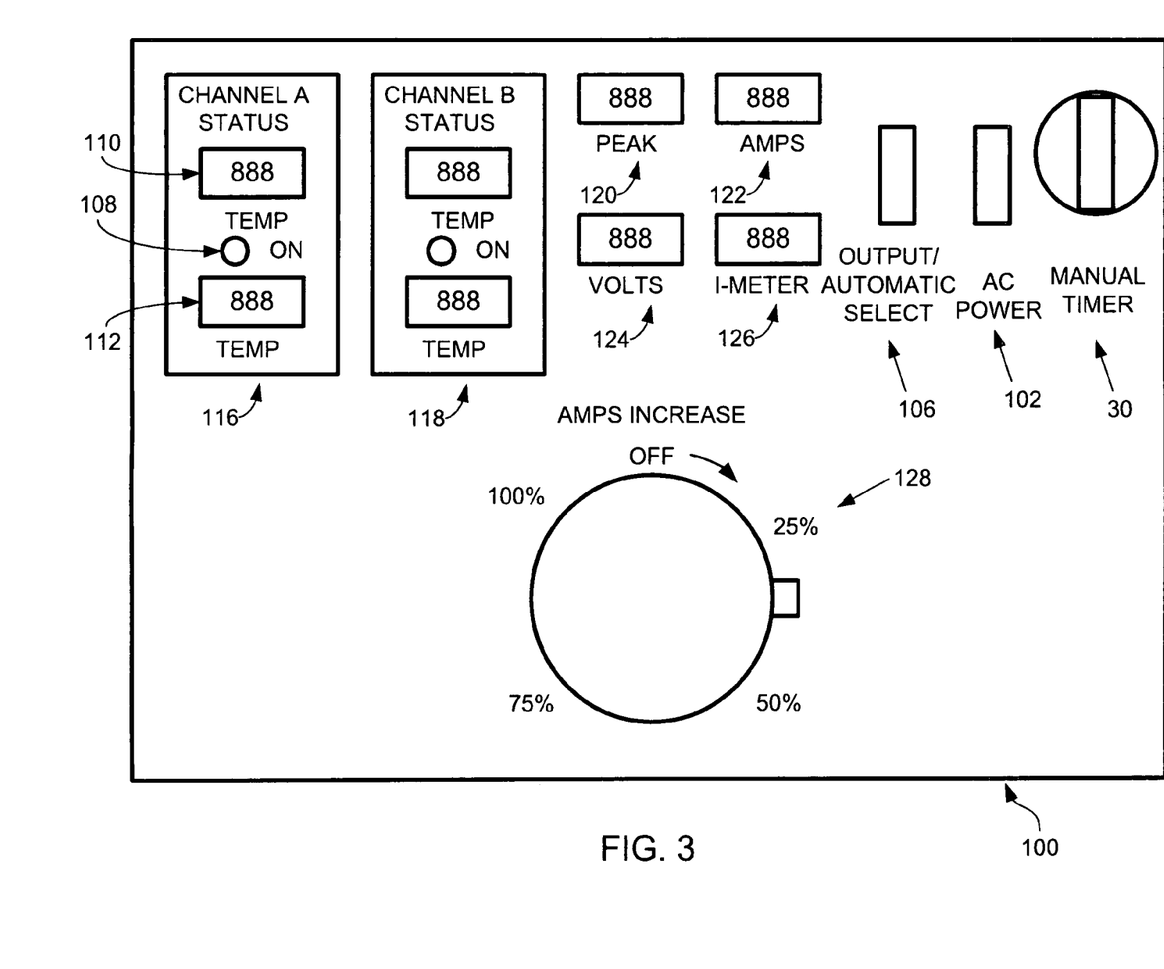
FIG. 3 is a front view of an exemplary master control panel.

An exemplary "missing peak" detector may include a circuit that senses the absence of a Pulse Width Modulated Signal and may perform a function upon such a detection (such as shut the system off, turn on a warning light, etc.). In some exemplary embodiments, a missing peak detector may function as a safety device that constantly monitors each individual channel by sampling the peak amps output of the pulse width modulated system. The missing pulse circuitry may include commercially available components that activate a channel specific safety relay, in the event that the system detects the absence of a PWM signal at the respective channel. If any channel is inoperative and fails to provide a PWM output signal, then the missing peak detector may trigger an alarm, extinguish the respective channel light and cause the safety logic system to trip. When the missing pulse detector fails to read a PWM signal, then the circuitry operates a relay or other electronic switching device, causing the Reset function of the J-K Flip-Flop 22 to go "Hi," thus shutting down the output of the system. In some exemplary embodiments a GREEN De-sulfate light may extinguished and a RED RESET light may illuminate on the front control panel 100. The missing peak detector may also act as a maintenance troubleshooting device to determine which channel may require maintenance.

In some exemplary embodiments including N channels, additional logic gates and/or logic gate chips may be configured in parallel and/or series. For example, such logic gates may be configured in a "walking ring" design such that they share the applied PWM input and deliver the desired PWM output to N channel power pack modules 14, 16, 18. Thus, for example, a four channel system may include four logic gates, each separately and evenly accepting one out of every four PWM input requirements, while providing one out of every four output requirements to four independent channel power pack modules 14, 16, 18.

In some example embodiments, an operator may use manually controlled digital switching circuitry and/or a microprocessor-controlled software driven algorithm to control an individual channel power pack module 14, 16, 18. In some exemplary embodiments, independent channel power pack modules 14, 16, 18 may improve performance and/or consistency of the square wave pulse within the operational parameters of the capacitors. In some exemplary embodiments, the consistency of the square wave pulses may allow an impedance-measuring device to compare peak amplitude against average amperage (e.g., root-mean-square (RMS) amperage), which may provide an indication of the degree of internal sulfation.

In some exemplary embodiments, a software driven microprocessor and/or a computer may provide the logic functions of the logic processing module 21 and/or MCB 12 and/or any individual components thereof. This may be accomplished by providing substantially similar inputs to those described above and by using a software written code and a microprocessor to replace or compliment the logic gate process. Such a microprocessor or computer may read various input conditions such as time, temperature of various components, on/off condition of temperature and/or timer switches, voltage, peak-to-peak amperage, RMS amperage levels of specific components, and/or other system-related and/or battery-related parameters. Once the various input parameters are read, the software instructions may compare the input parameters to a database of conditional parameters. The software instructions may then activate the system's operation and/or prevent, disable, and/or modify the system's operation.

FIG. 2 also illustrates output conductors 15, 17 connecting channel power pack modules 14, 16 to battery 5. Some exemplary de-sulfating devices 10 may include one or more battery output connections. For example, a de-sulfating device may include a motive battery style polarized connector corresponding to a connector on a motive battery and/or clamp connectors, which may be attached to the battery's terminals. In some example embodiments, such different connectors may be used to supply different voltages from one de-sulfating device 10. Providing different voltages from one de-sulfating device 10 may permit use of the de-sulfating device 10 with a wide variety of batteries of different sizes, configurations, etc.

Referring to FIG. 3, an exemplary de-sulfating device 10 may include a master control panel (MCP) 100, which may include various switches, instruments, indicators, and/or control devices for operating and monitoring the de-sulfating device 10. MCP 100 may include an AC power On/Off switch 102 that may control input source voltage to all subsystems. A manual timer 30 may be employed to cause the de-sulfating device 10 to shutdown in the event that it is left unattended. An output select/automatic mode switch 106 may be provided on exemplary de-sulfating devices 10, which include dual output voltage or automatic shutoff options, and output select switch 106 may allow an operator to select a higher voltage (e.g., about 100 VDC) or a lower voltage (e.g., about 30 VDC), and/or an automatic shutdown procedure, for example. MCP 100 may include various indicators which may provide information pertaining to a de-sulfation operation and/or de-sulfating device 10. For example, MCP 100 may include an "on" indicator light 108 and/or temperature indicators 110, 112 associated with individual channels 116, 118. MCP 100 may include indicators providing information pertaining to the de-sulfating current applied to the battery 5, such as peak indicator 120 (which may indicate peak-to-peak amps), amps indicator 122 (which may indicate RMS amps), volts indicator 124, and/or I-meter indicator 126 (which may indicate impedance). Amps indicator 122 may allow the operator to adjust the de-sulfating process voltage input to obtain a desired RMS amplitude, regardless of the battery's voltage, size or level of sulfation. Peak indicator 120 may allow the operator to adjust the de-sulfating process voltage input to obtain a desired Peak amplitude, regardless of the battery's voltage, size or level of sulfation. Volts indicator 124 may allow the operator to adjust the de-sulfating process voltage input to obtain a desired VOLTS output, regardless of the battery's voltage, size or level of sulfation. I-METER indicator 126 may allow the operator to determine the conclusion of the de-sulfating process, regardless of the battery's voltage, size or level of sulfation. In some exemplary embodiments, MCP 100 may include a power control knob 128, which may be operative to vary the voltage supplied by variable voltage AC source 46.

Some exemplary embodiments may measure impedance by comparing peak amperage to RMS amperage. An exemplary device may capture and compare the difference between RMS amperage and a peak amperage using a peak-hold circuit and/or may display this value on I-meter 126. The reading indicated on I-meter 126 may be used to estimate sulfation levels within a battery 5. I-meter 126 readings (which may by constantly or periodically monitored) may allow the operator to adjust the de-sulfating process voltage input to obtain the desired peak amplitude, regardless of the battery's voltage, size or level of sulfation, and may provide a quantitative value to aid an operator in assessing when a de-sulfation process has substantially reached its potential for lowering the battery's impedance, regardless of the battery's voltage, size or level of sulfation. Some exemplary embodiments may measure impedance by using commercially available devices and methodologies displaying them on the I-Meter.

Figure 4:
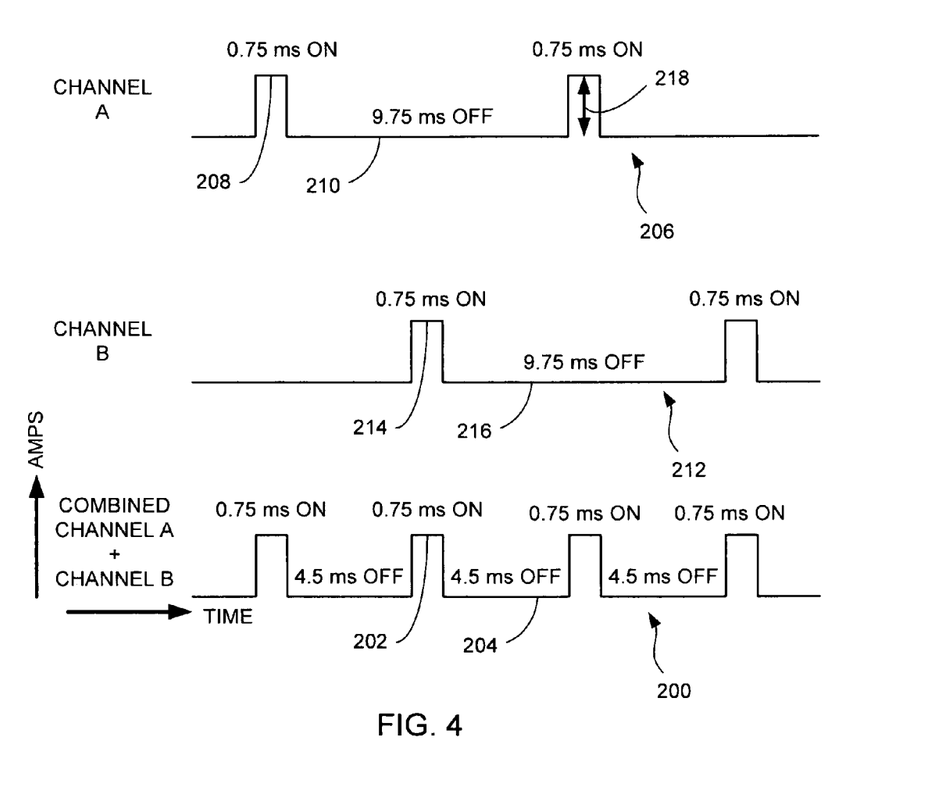
FIG. 4 is a waveform diagram showing waveforms contributed by individual channels and a resulting output waveform; all in accordance with at least some aspects of the present disclosure.

Referring to FIG. 4, in some exemplary embodiments, a de-sulfating current pattern supplied to a battery may include a repeating pattern of an "On" pulse followed by a "Resting or Off" period. For example, an exemplary de-sulfating current pattern 200 supplied to battery 5 may include a repeating sequence of an about 0.75 millisecond (ms) on pulse 202 followed by an about 4.5 ms off period 204. The durations of the various exemplary pulses and resting periods described herein are merely examples only, and it is within the scope of the disclosure to modify the durations of any on pulses and/or off periods discussed herein.

In an exemplary two-channel de-sulfating device 10 (e.g., a de-sulfating device 10 including a channel power pack module A 14 and a channel power pack modules B 16), a first channel (e.g., channel power pack module A 14) may provide a repeating current pattern 206 including an about 0.75 ms on pulse 208 followed by an about 9.75 ms off period 210. Similarly, a second channel (e.g., channel power pack module B 16) may provide a repeating current pattern 212 including an about 0.75 ms on pulse 214 followed by an about 9.75 ms off period 216. As illustrated in FIG. 4, the combination of such individual channel repeating current patterns 206, 212 may provide de-sulfating current pattern 200 include a repeating sequence of an about 0.75 ms on pulse 202 followed by an about 4.5 ms off period 204 to battery 5.

Application of such a de-sulfating pattern may provide a resonant vibration/ionic restorative charge within the battery's internal lead plates. This resonant vibration/ionic restorative charge may remove the lead sulfate accumulation from the lead plates, which may lower the impedance of the battery. Furthermore, the applied frequency/restorative charge may break apart and/or dissolve lead crystals, thereby increasing the specific gravity of the electrolyte. The battery's impedance may be lowered and/or may be returned to a near new battery impedance levels and/or the battery's conductance may be increased to the near new levels, which may increase battery performance.

In some exemplary embodiments, an automatic mode may provide a peak amplitude 218 based upon a predetermined set of amplitude values in a database correlated with a particular type of battery being de-sulfated. The present disclosure contemplates that different battery types, levels of impedance, and/or other environmental conditions may benefit from an operator-adjusted peak amplitude. In some example embodiments, an operator may adjust the peak amplitude, such as by rotating a control knob (e.g., power control knob 128) on the variable voltage alternating current source 46, for example. In some exemplary embodiments, adjustment of power control knob 128 may adjust the voltage provided by variable voltage alternating current source 46, which may result in adjustment of the peak amplitude, voltage and/or RMS amperage of the pulses. Some exemplary de-sulfating devices may allow variability of the output voltage sufficient to de-sulfate batteries with a wide range of nominal battery voltage from 0 VDC to 300 VDC, for example and without limitation. Some exemplary embodiments may provide output pulses in a range of about 0-300 volts and/or may have no baseline charging voltage level. In an alternative mode of operation, an exemplary device may provide a charge current without pulses. Some exemplary de-sulfating devices may provide such a charge current by adjusting the PWM factor to zero, thus producing a substantially constant potential output. In an alternative mode of operation, an exemplary device may provide a charge current with pulses of a high frequency, thus becoming a "high Frequency" charging device. Some exemplary de-sulfating devices may provide such a charge current by adjusting the PWM factor between 1000 hz and 100,000 hz, thus producing a high frequency current output.

Similarly, in some circumstances, it may be advantageous for the de-sulfating current pattern supplied to battery 5 to be variable by the operator. For example, different battery types, levels of impedance, and/or environmental conditions may cause certain de-sulfating current patterns to be advantageous. Some exemplary de-sulfating devices 10 may allow an operator to select the frequency/pattern and/or de-sulfating device 10 may be pre-set to a standard set of output parameters. In some example embodiments, a manual mode may allow an operator to specify the "On" state duration and/or the "Resting or Off" state duration of the generated PWM signal using a potentiometer, switch, and/or other input method. Some exemplary de-sulfating devices may be configurable by an operator and/or manufacturer to de-sulfate using a repeating current pattern including between about 500 microseconds and about 1.5 milliseconds "ON" state followed by between about 2-6 milliseconds of "Resting or OFF" state, for example.

In some exemplary embodiments, on pulses 208, 214 may provide a peak amperage of about 30 amps. In some exemplary embodiments, on pulses 208, 214 may provide a peak amperage of about 130 amps. In some exemplary embodiments, a variable mode may allow an operator to select a peak amperage in real time. In some embodiments, the peak to peak amperage may be varied manually or automatically in accordance with a predetermined program and/or one or more sensed indications. In some exemplary embodiments, a de-sulfating device 10 may be operated in a constant current charger mode in which one or more channels may be activated and may remain on to provide a substantially constant potential to battery 5, which may charge battery 5. In some exemplary embodiments, a de-sulfating device 10 may be operated in a high frequency charger mode in which one or more channels may be activated at a high on/off frequency current to battery 5, which may charge battery 5.

Exemplary methods of de-sulfating a battery may include connecting a de-sulfating device to a lead-acid battery, which may of virtually any size and/or voltage. De-sulfating device 10 may be electrically connected the positive and negative terminals of a battery, or to an individual cell. In some exemplary embodiments, an operator may choose and/or adjust a PWM frequency to be generated by the Master Control Board Circuitry and/or the peak amplitude of the pulses, which may be determined by the variable voltage alternating current source 46.

In an exemplary process, a de-sulfating device 10 may be connected to the battery 5, the voltage, de-sulfating time, and/or PWM frequency may be selected, and de-sulfating device may be turned on. Approximately 1 to 3 hours later, the de-sulfating device may be turned off and the battery 5 may be now ready to be returned to service. The operator may select and/or adjust the appropriate levels of peak, voltage and RMS amperages and/or may select and/or control the PWM timing and duration.

An example de-sulfating operation may begin at an initial voltage of about 36 VDC, an initial amperage of about 20 amps, an initial peak amperage of about 230 amps, and an initial I-meter reading of about 165. An initial per-cell impedance may be about 1.0-1.3 milliohms per cell. After an exemplary de-sulfating device 10 is operated for about one hour, a final voltage may be about 39.5 VDC, a final amperage may be about 17.5 amps, a final peak amperage may be about 180 amps, and a final I-meter reading may be about 120. A final per-cell impedance may be about 0-0.2 milliohms per cell, which may be approximately the per-cell impedance of a new battery.

Some exemplary de-sulfating devices 10 may allow de-sulfation of a battery or cell regardless of the initial voltage value of the battery or cell. Thus, a 6-volt, 8-volt, 12-volt, 24-volt, 36-volt 48-volt, 60-volt, 72-volt, and/or higher voltage batteries may be reconditioned, even if the battery voltage is between 0 volts and the nominal battery voltage.

Some exemplary devices may be utilized to de-sulfate individual cells with individual cell terminal posts or adjacent cells of a battery with individual cells connected in series, such as in motive batteries. Some exemplary devices may be utilized to de-sulfate an individual cell of a battery without individual cell terminal posts by immersing probes in the electrolyte solution.

Some exemplary de-sulfating devices 10 may be configured to de-sulfate maintenance free sealed lead-acid, Valve Regulated Lead Acid, Absorbed Gas Mat lead-acid batteries in a range of about 20-30 amps peak to peak, for example. Some exemplary de-sulfating devices 10 may be configured to de-sulfate flooded lead-acid batteries of the typical automotive battery design in a range of between about 40 and 90 amps peak to peak, for example. Some exemplary de-sulfating devices 10 may be configured to de-sulfate flooded lead-acid batteries of the typical golf car battery design in a range of between about 40 and 150 amps peak to peak, for example. Some exemplary de-sulfating devices 10 may be configured to de-sulfate flooded lead-acid batteries of the typical motive battery design in a range of between about 130 to 350 amps peak to peak, for example. Exemplary operating parameters may include, without limitation, an output frequency of approximately 230 cycles per second and an output current of approximately 250 amps peak.

Some exemplary de-sulfating devices 10 according to the present disclosure may be considered "Universal" battery de-sulfating and/or charging devices, because they may allow the operators wide ranging control of the electrical PWM characteristics, different settings, and/or adjustments necessary to de-sulfate large motive batteries (e.g., forklift batteries) as well as small batteries (e.g., automotive batteries), regardless of their nominal voltage. Some exemplary de-sulfating devices 10 may be configured for installation and/or use in a fixed location, and some exemplary de-sulfating devices 10 may be portable. In some circumstances, such portable de-sulfating devices 10 may be transported to a battery's location for use and/or a battery may be transported to a location of a fixed or portable de-sulfating device 10.

In some exemplary embodiments, a data logger may be configured to collect, store and/or transmit data about the de-sulfating device and/or battery performance to a computer and/or other collection device. Some exemplary embodiments may include one or more wired and/or wireless data logging and/or transmission modules, which may store and/or transmit real time and/or stored de-sulfating data, charging data, and/or battery performance data to a computer. Some exemplary embodiments may include one or more wired and/or wireless data logging and/or transmission modules, which may store and/or transmit real time and/or stored de-sulfating data, charging data, and/or battery performance data to an internet based communications system.

While exemplary embodiments have been set forth above for the purpose of disclosure, modifications of the disclosed embodiments as well as other embodiments thereof may occur to those skilled in the art. Accordingly, it is to be understood that the disclosure is not limited to the above precise embodiments and that changes may be made without departing from the scope. Likewise, it is to be understood that it is not necessary to meet any or all of the stated advantages or objects disclosed herein to fall within the scope of the disclosure, since inherent and/or unforeseen advantages may exist even though they may not have been explicitly discussed herein.

What is claimed is:

1. A method of de-sulfating a battery comprising:
   connecting a de-sulfating device to a battery;

applying electrical pulses to the battery using the de-sulfating device, wherein the operation of applying electrical pulses to the battery using the de-sulfating device includes selectively repeatedly activating a plurality of channel power pack modules electrically connected between an alternating current source and the battery;

wherein, when activated, an individual channel power pack module provides one ON pulse to the battery, and wherein the plurality of channel power pack modules includes a first channel power pack module and a second channel power pack module; and wherein the operation of applying electrical pulses to the battery using the de-sulfating device includes alternately activating the first channel power pack module and the second channel power pack module so that together, the first channel power pack module and the second channel power pack module provide pulses including a repeating pattern including an about 0.1-1.5 ms ON pulse followed by an about 1-6 ms OFF period.

2. A battery de-sulfation device comprising:

an alternating current source;

output conductors configured for electrical connection to a battery;

a plurality of channel power pack modules electrically interposing the alternating current source and the output conductors, each channel power pack module including a rectifier electrically connected to the alternating current source, a capacitor electrically connected to an output of the rectifier, a switching device electrically connected to the capacitor, and a diode electrically connected to the output of the switching module; and a master control board operative to control a conduction state of each of the switching devices;

wherein the master control board is configured to control the conduction states of the switching devices to provide a pulsed direct current output to the battery;

wherein the master control board is configured to control the conduction states of the switching devices associated with the first channel power pack module and the second channel power pack modules alternately such that each of the first channel power pack module and the second channel power pack module outputs a repeating pattern including an about 0.75 ms ON pulse followed by an about 9.75 ms OFF period and, together, the first channel power pack module and the second channel power pack module provide to the battery a repeating pattern including an about 0.75 ms ON pulse followed by an about 4.5 ms OFF period.

3. The device of claim 2, wherein the alternating current source is a variable voltage alternating current source, and wherein a voltage output from the variable voltage alternating current source is adjustable by an operator.

4. The device of claim 2, wherein the master control board is configured to control the conduction states of the switching devices to provide a pulsed direct current output to the battery including a repeating pattern including approximately 0.75 ms ON pulses interposed by approximately 4.5 ms OFF periods.

5. The device of claim 2, further comprising;

a peak amperage indicator providing an indication of a peak amperage provided to the battery;

an average amperage indicator providing an indication of a root-mean-square amperage provided to the battery; and an impedance indicator providing an indication of an impedance of the battery;

wherein the impedance is determined at least in part by ascertaining a difference between the peak amperage provided to the battery and the root-mean-square amperage provided to the battery.

6. The device of claim 2, wherein the plurality of channel power pack modules comprise two or more channel power pack modules; and each additional channel power pack module corresponds to lower frequency pulses by each channel power pack module.

* * * * *